Figure 1:
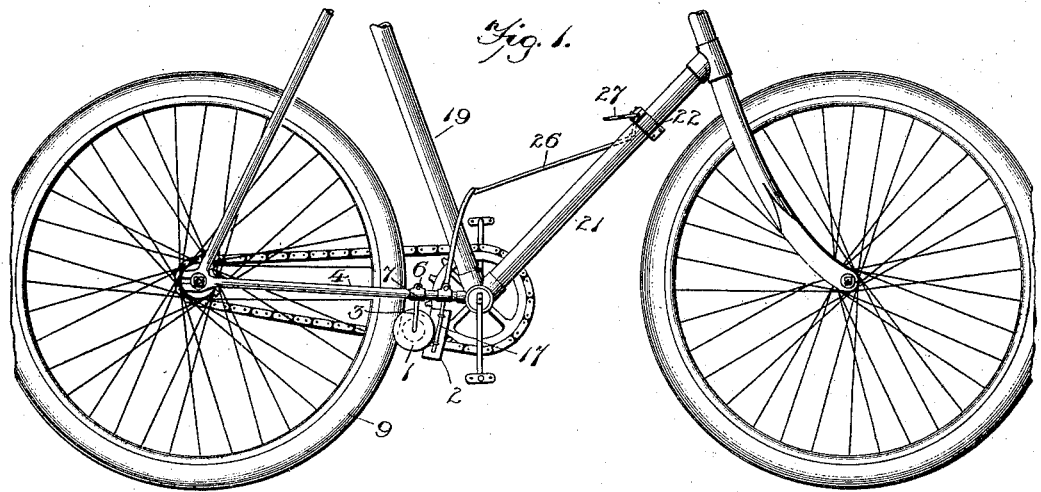

No. 612,728. Patented Oct. 18, 1898.
W. J. HINKSON.
BICYCLE BRAKE.
(Application filed Jan. 26, 1898.)

(No Model.)

Witnesses
T. L. Mockabee
H. L. Amer

Inventor
William J. Hinkson
by V. S. Stockbridge
his Attorney

UNITED STATES PATENT OFFICE.

WILLIAM J. HINKSON, OF NORTH HOPE, PENNSYLVANIA.

BICYCLE-BRAKE.

SPECIFICATION forming part of Letters Patent No. 612,728, dated October 18, 1898.

Application filed January 26, 1898. Serial No. 668,041. (No model.)

*To all whom it may concern:*

Be it known that I, WILLIAM J. HINKSON, a citizen of the United States, residing at North Hope, in the county of Butler and State of Pennsylvania, have invented certain new and useful Improvements in Bicycle-Brakes; and I do hereby declare the following to be a full, clear, and exact description of the invention, such as will enable others skilled in the art to which it appertains to make and use the same.

This invention relates to brakes, and is especially designed for use upon bicycles, although, of course, the use of the brake is not limited to the application shown and hereinafter described.

The object of the invention is to provide a brake especially designed for use upon pneumatic tires, whereby the wear upon such tires may be materially decreased and at the same time the brake mechanism arranged within easy reach and control of the rider.

The detailed objects and advantages of the invention will appear in the course of the subjoined description.

The invention consists in certain novel features and details of construction and arrangement of parts, as hereinafter fully set forth, illustrated in the drawings, and incorporated in the claims hereto appended.

Figure 2:
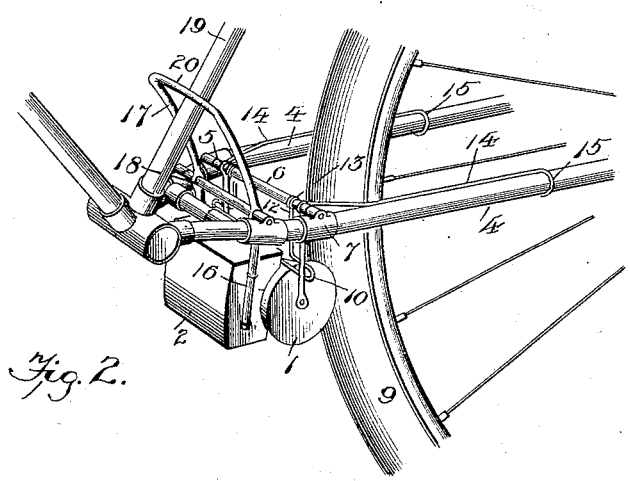
Figure 4:
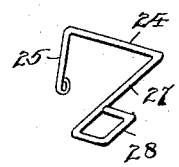
Figure 5:
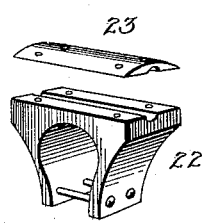
Figure 3:
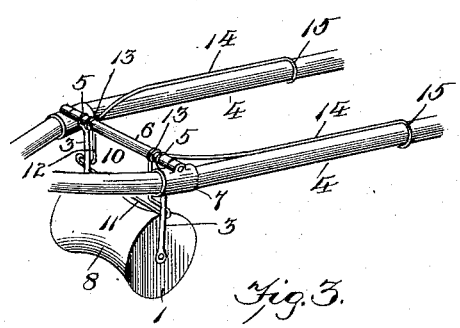

In the accompanying drawings, Figure 1 is a side elevation of a bicycle, showing the improved brake applied thereto. Fig. 2 is a detail perspective view showing the improved brake adapted for application by the foot of the rider. Fig. 3 is a detail perspective view showing the manner of mounting the friction-roller and the spring for throwing the roller out of contact with the tire. Fig. 4 is a detail perspective view of the foot-lever mounted on the reach-bar of the machine-frame. Fig. 5 is a detail perspective view of the clip for the foot-lever.

Similar numerals of reference designate corresponding parts in all the figures of the drawings.

The improved brake contemplated in this invention embodies, essentially, a friction-roller 1, which constitutes the brake-shoe, and a friction shoe or block 2, the roller 1 being interposed between the shoe or block 2 and the tire of the machine, preferably the tire of the back wheel.

The roller 1 is journaled in a pair of hanger-arms 3, which depend from the rear-fork members 4 of the machine-frame. At their upper ends the hanger-arms 3 are provided with eyes 5, through which is received a transverse shaft 6, extending across, between, and over the fork members 4 and secured in suitable clips 7, mounted on the fork members 4. The roller 1 has a concave periphery 8, corresponding approximately in curvature to the cross-sectional shape of the tire 9, and is held normally away from the tire by means of a spring 10, which is preferably formed of wire. The central portion 11 of the spring 10 extends transversely across and in rear of the hanger-arms 3 and bears against said arms for normally forcing the same forward. The terminals 12 of the spring are then extended upward and given one or more coils, as shown at 13, around the rod 6. The end portions 14 of the spring are then extended forward along the fork members 4, and the extremities of the spring are then hooked or bent, as shown at 15, around the members 4, thus securely holding the spring in place.

The friction shoe or block 2 is concave upon one side, as indicated at 16, to conform to the periphery of the roller 1, and is carried by the lower ends of a pair of parallel lever-arms 17, which extend upward and are journaled upon a cross rod or shaft 18, secured to the fork members 4, in advance of the shaft or rod 6. The lever-arms 17 are carried upward and curved forward, so as to lie upon opposite sides of the seat-post tube 19 of the machine, and are connected by a cross-bar portion 20, to which the foot of the rider may be applied for forcing the shoe or block 2 rearward and causing it to force the roller 1 into contact with the tire.

Mounted upon the reach-bar 21 of the machine is a clip 22, having a removable cap 23 bolted or screwed thereon. Journaled in the clip 22 is a short transverse shaft 24, having at one end a crank-arm 25, from which a rod or other suitable connection 26 extends to the cross-bar portion 20 of the arms 17. At the opposite end of the shaft 24 is a second crank-arm 27, having a treadle or foot-piece 28 to receive the foot of the rider. The rider by pressing downward on the treadle 28 rocks the shaft 24 and draws forward on the connection 26, thus rocking the lever or lever-arms 17, forcing the shoe or block 2 rearward and moving the friction-roller 1 into engagement with the tire 9. The more pressure that is put upon the lever-arms 17 the greater will be the force with which the roller 1 is pressed against the tire 9 and the greater the friction of said roller upon the tire and the resistance to the revolution of the wheel.

From the foregoing description it will be seen that wear upon the tire is reduced to a minimum, as in the revolution of the wheel the frictional contact between the tire 9 and roller 1 will effect a rotation of said roller and resistance to the rotation of the roller will be effected by the shoe or block 2.

The roller 1 may, if desired, be provided with a rubber tread or may be composed entirely of rubber or of wood and rubber or any suitable material, and the friction block or shoe 2 may be composed either of steel or wood or other suitable material, and, if desired, be faced with rubber or leather. The wear will fall principally upon the shoe or block 2 and the roller 1 and be taken from the tire 9.

It will of course be understood that the improved brake hereinabove described is susceptible to various changes in the form, proportion, and minor details of construction, which may accordingly be resorted to without departing from the principle or sacrificing any of the advantages of the invention.

Having thus described the invention, what is claimed as new, and desired to be secured by Letters Patent, is—

1. In a bicycle-brake, in combination, a friction-block, a pivoted hanger therefor, a lever rigidly connected to said hanger and embracing the seat-post tube, a friction-roller, an independent pivoted hanger therefor, and a spring having its central portion engaged with the hanger of the roller and its terminal portions engaged with the machine-frame, substantially as described.

2. In a bicycle-brake, in combination, a friction-block, a pivoted hanger therefor, a bail-shaped lever rigidly connected to said hanger and embracing the seat-post tube and having a horizontal connecting portion located in front of said tube, a friction-roller, an independent pivoted hanger therefor, and a spring having its central portion engaged with the hanger of the roller and its terminals engaged with the rear fork of the machine-frame.

In testimony whereof I affix my signature in presence of two witnesses.

WILLIAM J. HINKSON.

Witnesses:
PLUM MIFFLIN,
J. F. HARPER.